May 23, 1961 J. KOZAK 2,985,204
APPARATUS FOR BORING SQUARE HOLES
Filed Dec. 1, 1958 2 Sheets-Sheet 1
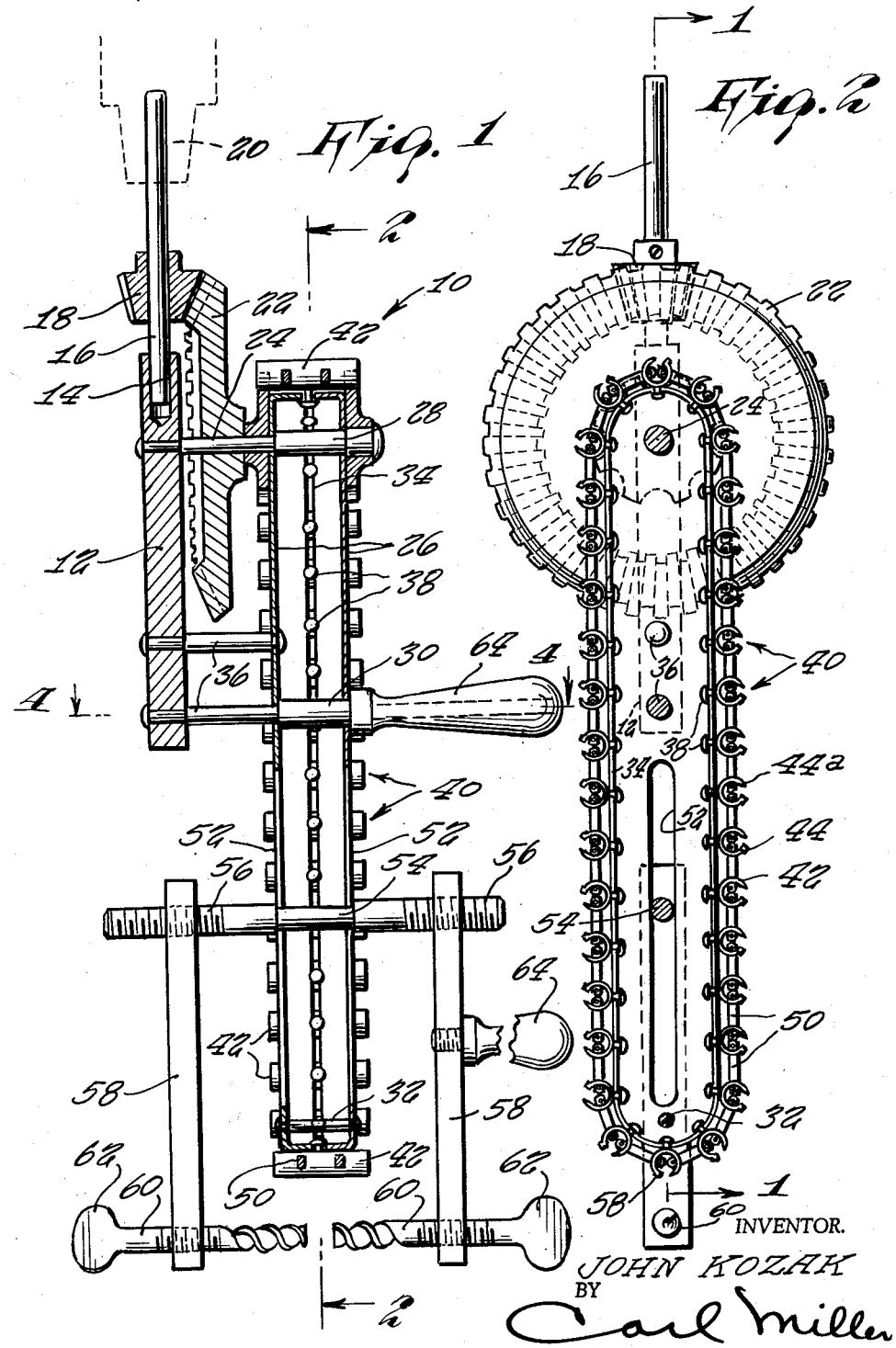
INVENTOR.
JOHN KOZAK
BY Carl Miller
ATTORNEY

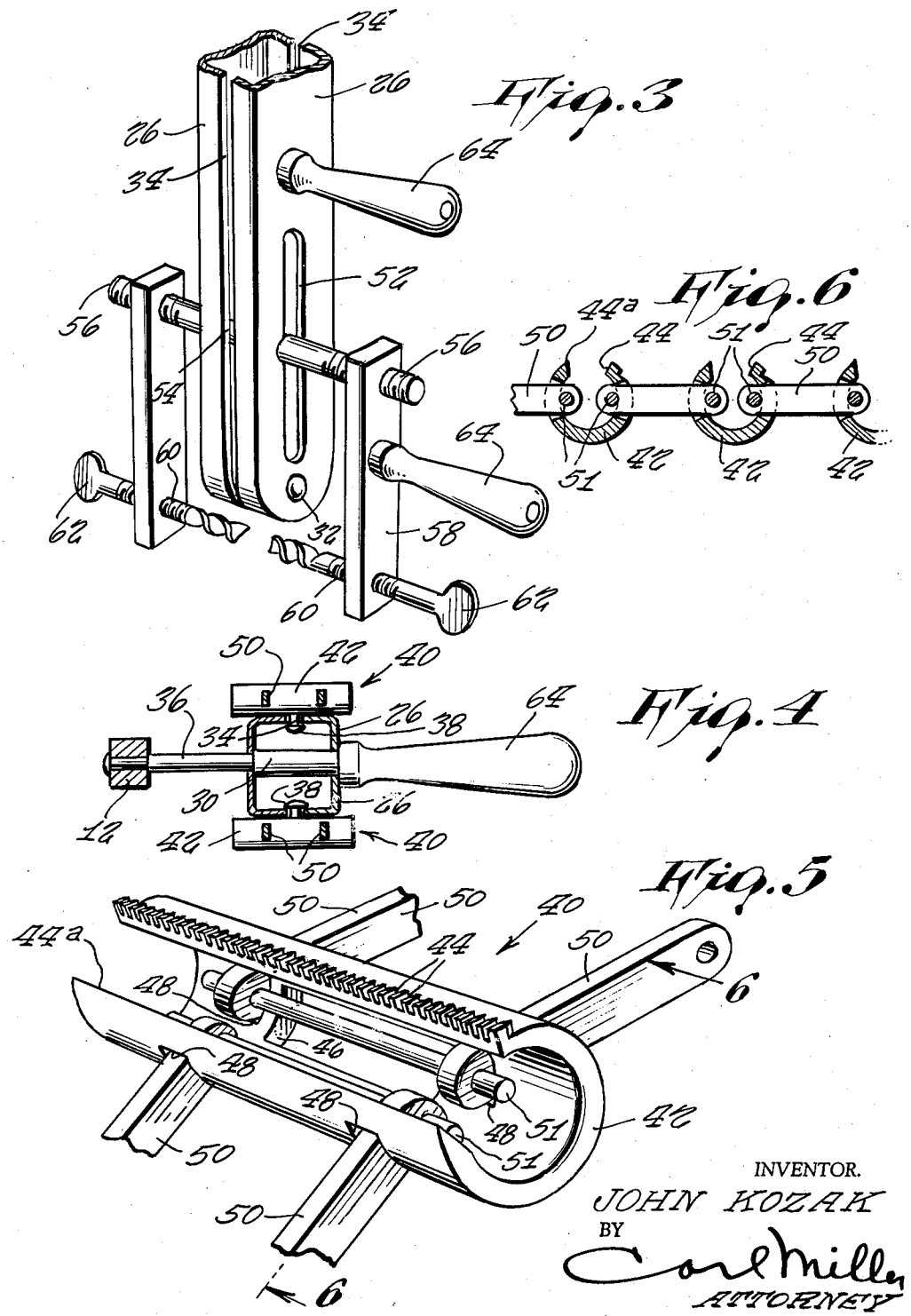

United States Patent Office 2,985,204
Patented May 23, 1961

2,985,204
APPARATUS FOR BORING SQUARE HOLES
John Kozak, 137 14th St., Brooklyn, N.Y.
Filed Dec. 1, 1958, Ser. No. 777,303
1 Claim. (Cl. 144—73)

This invention relates to power tools and, more particularly, to an accessory therefor.

There are many instances when it is necessary to provide a square hole in wooden objects. Ordinarily, such requires the use of a hammer and chisel and a relatively long period of time to accurately form such square hole when such is required. Accordingly, it is an object of the present invention to provide an accessory that may be used with portable power equipment which will effectively cut a square bore in a simple and efficient manner, and in a relatively short period of time.

Another object of the present invention is to provide wood cutting apparatus for forming square shaped bores of any desired depth and size completely automatically and without the use of hand or semi-automatic equipment.

An additional object of the present invention is to provide a power tool accessory of the type described that can be readily attached to any small power hand drill and used by a single individual with extreme accuracy and safety.

All of the foregoing and still further objects and advantages of this invention will become apparent from a study of the following specification, taken in connection with the accompanying drawing, wherein:

Figure 1 is a longitudinal cross sectional view taken along line 1—1 of Figure 2, of a device made in accordance with the present invention in operative use;

Figure 2 is a transverse cross sectional view taken along line 2—2 of Figure 1;

Figure 3 is a fragmentary perspective view of certain parts of the present invention;

Figure 4 is a transverse cross sectional view taken along line 4—4 of Figure 1;

Figure 5 is an enlarged perspective view of a cutter element forming a part of the present invention; and Figure 6 is a fragmentary longitudinal cross sectional view taken along line 6—6 of Figure 5.

Referring now to the drawing, and more particularly to Figures 1 and 2 thereof, apparatus 10 for boring a hole of square cross section made in accordance with the present invention, is shown to include a base plate 12 having a longitudinal bore 14 countersunk within one upper end for rotatably supporting the lower end of the drive shaft 16. The opposite end of this drive shaft 16 is receivable within the chuck 20 of any power tool such as the power hand drill. A bevel pinion 18 is secured intermediate the ends of the drive shaft 16 and is in meshing engagement with a reduction bevel gear 22 that is secured upon a cross shaft 24. This cross shaft is rotatably supported upon the base plate 12 and upon a mounting plate assembly consisting of a pair of substantially identical elliptically shaped shallow trays 26 that are secured in slightly spaced apart facing relationship by means of spacers 28, 30 integral with the cross shaft 24 and attachment bolts 36, respectively.

As is more clearly shown in Figures 1 and 3 of the drawing, the plates 26 of the mounting plate assembly define a peripheral groove or slot 34 that slidably receives the heads 38 of cutter elements 40 forming a continuous endless chain of cutting elements for purposes hereinafter more fully described. With specific reference now to Figures 5 and 6 of the drawing, each such cutter element 40 includes a segmental cylindrical member 42 having a longitudinal slot that faces outwardly from the mounting plate assembly and defines a single cutting edge that includes a plurality of spaced apart cutting teeth 44. The opposite side of the cylindrical member 42 includes cutouts 46 through which shavings may readily escape so as to prevent jamming of the cutting elements upon the mounting plate assembly. Each such segmental cylindrical member 42 is further provided with spaced apart rectangular openings 48 that receives the ends of connecting link 50 therewithin which are further secured by means of transversely extending pivot pins 51. It will thus be recognized that the endless chain of cutting elements 40 is rotated about the mounting plate assembly by the gear train 18, 22 from the drive shaft 16. It will be further noted that the cutter element 40 not only includes the plurality of spaced apart cutting teeth 44, which accomplishes first, the perforating of the wood, and then is followed up by direct cutting by the blade 44a, so that the wood is gouged out or scooped out as desired, thereby eliminating the shavings from the square or rectangular hole made in the wood, or whatever material is being worked upon.

Each mounting plate 26 is further provided with an elongated longitudinal slot 52 that slidably receives the reduced central portion 54 of a threaded shaft member having the opposite ends 56 threadedly engaged with depending arms 58 that threadedly support lock screws with wood bit points 60 at their opposite ends that may be selectively actuated by flattened head portions 62. These arms 58, connecting shaft 56, and lock screws may be secured in clamping engagement to the work piece so that the lowermost end of the mounting plate assembly and cutting elements may be moved perpendicularly into engagement therewith so that the cutter elements 40 may bore a hole of square configuration, conforming generally to the over all outline of the cutting elements and mounting plate assembly illustrated in Figure 4. Handles 64 connected respectively to one of the arms 58 and mounting pin 36 facilitate the manipulation of the device in use so that it may be operated accurately and completely safely. As the tool cutting elements are moved downwardly into cutting engagement with the work piece, the cutting elements cut and remove the chips from the work piece so that a clean job may be had at all times.

While this invention has been described with particular reference to the construction shown in the drawing, it is to be understood that such is not to be construed as imparting limitations upon the invention, which is best defined by the claim appended hereto.

What I claim as new and desire to protect by Letters Patent of the United States is:

Manually controlled apparatus for boring a hole of square cross section comprising, in combination, a main base plate, a rigid mounting plate, spacers securing said mounting plate in spaced apart parallel relationship with said base plate, an endless chain of cutters supported upon said mounting plate for continuous movement in one direction, power means for effecting rotation of said endless chain around said mounting plate, guide means slidably supporting said mounting plate for reciprocating longitudinal movement relative to a work piece to direct said cutters into cutting engagement therewith, said power means comprising a drive shaft rotatably carried at one end upon said base plate engageable at the opposite end with the chuck of a rotary power tool, gear means drivingly connected between said drive shaft and said chain of cutters, said gear means comprising a cross shaft rotatably carried by said base plate and said mounting plate, a bevel pinion gear secured upon said drive shaft, a reduction bevel gear secured upon said cross shaft in meshing engagement with said pinion gear, and a sprocket secured to said cross shaft in meshing engagement with said chain of cutters for driving said cutters in said one direction, wherein said chain of cutters comprises a plurality of cutting elements of substantially equal size and shape having outwardly facing cutting edges, and a plurality of links each pivotally connected at opposite ends to adjacent cutters, wherein each of said cutter elements comprises a segmental cylindrical member extending transversely of the chain, having an outwardly facing longitudinal slot defining one leading edge, said leading edge including a plurality of spaced apart scoring cutting teeth, and a straight uninterrupted trailing edge aligned with the leading edge for cutting and gouging out cut particles.

References Cited in the file of this patent

UNITED STATES PATENTS

| | | |
|---|---|---|
| 553,280 | Dukes | Jan. 21, 1896 |
| 604,707 | Wilcox | May 24, 1898 |
| 1,170,120 | Slonaker | Feb. 1, 1916 |
| 1,637,464 | Bianca | Aug. 2, 1927 |
| 1,690,697 | Palmu | Nov. 6, 1928 |
| 2,645,255 | Francescatti et al. | July 14, 1953 |